United States Patent
Wurth et al.

(10) Patent No.: US 7,267,776 B2
(45) Date of Patent: Sep. 11, 2007

(54) FOAMS FOR REMOVING POLLUTANTS AND/OR HEAVY METALS FROM FLOWABLE MEDIA

(75) Inventors: Bernd Wurth, Wermelskirchen (DE); Bernd Lehmann, Köln (DE); Klaus-Dieter Novak, Moers (DE); Hendrik Kathrein, Grevenbroich (DE); Andreas Schlegel, Krefeld (DE)

(73) Assignee: LANXESS Deutschland GmbH, Leverkusen (DE)

( * ) Notice: Subject to any disclaimer, the term of this patent is extended or adjusted under 35 U.S.C. 154(b) by 44 days.

(21) Appl. No.: 11/121,858

(22) Filed: May 4, 2005

(65) Prior Publication Data

US 2005/0252863 A1    Nov. 17, 2005

(30) Foreign Application Priority Data

May 5, 2004    (DE) .................. 10 2004 022 766

(51) Int. Cl.
C02F 1/42    (2006.01)
(52) U.S. Cl. .................. 210/688; 210/912; 521/92
(58) Field of Classification Search .............. 210/688, 210/912; 521/92
See application file for complete search history.

(56) References Cited

U.S. PATENT DOCUMENTS

| | | | |
|---|---|---|---|
| 5,124,044 A * | 6/1992 | Cassidy et al. ............. | 210/683 |
| 5,997,747 A | 12/1999 | Jowett ....................... | 210/670 |
| 6,855,739 B2 * | 2/2005 | Becker et al. .............. | 521/92 |
| 2003/0209495 A1 | 11/2003 | Schlegel .................... | 210/660 |
| 2005/0029198 A1 * | 2/2005 | Tepper et al. ............... | 210/688 |

FOREIGN PATENT DOCUMENTS

| | | | |
|---|---|---|---|
| DE | 4103165 A | * | 8/1992 |
| DE | 43 20 003 | | 12/1994 |
| FR | 2624758 | | 6/1989 |
| JP | 8089951 A | | 9/1994 |
| JP | 6277504 | | 10/1994 |

OTHER PUBLICATIONS

Water Research, 36 (2002) p. 5141-5155, I. A. Katsoyiannis et al, "Removal of arsenic from contaminated water sources by sorption onto iron-oxide-coated polymeric materials".

* cited by examiner

*Primary Examiner*—Chester T. Barry
(74) *Attorney, Agent, or Firm*—Nicanor A. Kohncke

(57) ABSTRACT

The present invention relates to a method of using foam to remove pollutants and/or heavy metals from a flowable media. The method may include providing a foam that may include cavities wherein the cavities may include an adsorbent composition of iron oxyhydroxy granules. The iron oxyhydroxy granules may have a BET surface area of >100 $m^2/g$ and a mean particle size of 0.1 mm-2 mm. The method may further include passing a flowable media containing pollutants and/or heavy metals through the foam wherein the pollutants and heavy metals may be removed from the flowable media by the iron oxyhydroxy granules. A method of manufacturing the foam is also disclosed. The method may include introducing an adsorbent composition into a liquid reaction composite to form a mixture and adding an isocyanate reaction component to the mixture to form the foam.

8 Claims, 1 Drawing Sheet

FOAMS FOR REMOVING POLLUTANTS AND/OR HEAVY METALS FROM FLOWABLE MEDIA

FIELD OF THE INVENTION

The present invention relates to foams containing an adsorbent composition, a process for their production and also use thereof.

BACKGROUND OF THE INVENTION

Pollutants and/or heavy metals, for example a phosphate pollution, are found, for example, in aquarium water and pond water. Phosphate ions are introduced via the fish food and via discharges into the water, which causes severe algal growth. If it is wished to prevent this it is necessary to change the water regularly which, in particular in the case of seawater aquaria, leads to considerable costs, or to remove phosphate from the water using absorbers.

An elevated arsenic content is met, for example, in some groundwater sources.

Previously known processes for removing pollutants and/or heavy metals such as phosphate, arsenic and some other ions from flowable media such as water are based on the adsorption to various substances, or ion exchange.

Commerce offers granulated products which are introduced into water filters. An effective product has proven to be, for example, granulated iron hydroxide, as described in DE-A 4 320 003. JP 08089951 describes filters packed with aluminium hydroxide or iron hydroxide. In this case, the used adsorber must be replaced after the service life. Sufficient porosity of the filter material is of importance here to ensure sufficient through-flow, the packed height of the adsorber layer having an effect on the through-flow velocity of the water.

The inventors of the present invention recognized that disadvantageous here is the laborious handling of loose filter materials and the turbidity of the water due to finely divided filter breakthrough which is produced on first filling and change of adsorbate. The abovementioned JP 08089951 describes, for example, the workup of sludge.

U.S. Pat. No. A1 5,124,044 describes a process for impregnating sponges with iron chloride and ammonia solution to precipitate $Fe(OH)_3$ in the sponge. This reaction, however, can be controlled only with difficulty in practice. JP 06277504 presents the production of an absorber by mixing microparticles with a gel and subsequent dewatering.

SUMMARY OF THE INVENTION

The aspect underlying the invention is to provide a foam for use in flowable media, which foam removes pollutants and/or heavy metals from flowable media such as water, and also leaves behind little turbidity-producing substances in flowable media, compared with loose filter materials.

This aspect has been achieved by foams comprising an adsorbent composition. Foam within the meaning of the invention means the dispersion of gas in the solid, for example a foamed solid and/or plastic.

DETAILED DESCRIPTION OF THE INVENTION

Figure 1:
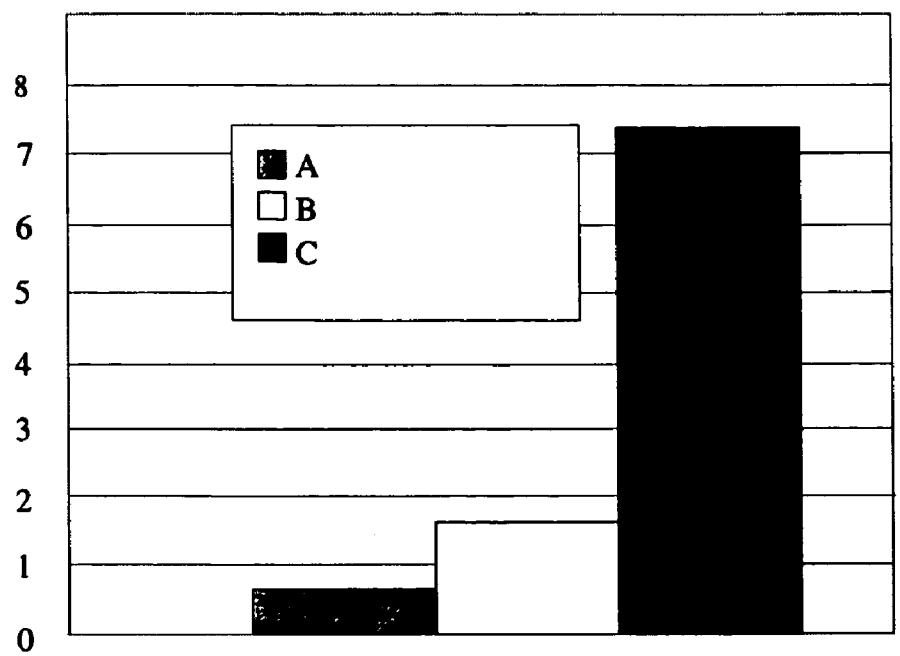
FIG. 1 is a bar graph illustrating turbidity of aquarium water for different treatment including the present invention.

The adsorbent composition preferably contains an iron oxide structure and/or iron oxyhydroxide structure based on $\alpha$-, $\beta$-, $\gamma$-, $\delta$-, and/or $Fe(OH)_2$ phases, ferrihydrite phases and also mixed and intermediate phases of the same.

In addition to, or instead of, the iron oxide and/or iron oxyhydroxides, preferably iron carbonates can be used and/or the iron oxides and/or iron oxyhydroxides can preferably be consolidated with oxides and/or (oxy)hydroxides of the elements Al, Mg, Ti.

The adsorbent composition preferably has a BET surface area of >10 $m^2$/g, particularly preferably >30 $m^2$/g, and very particularly preferably >100 $m^2$/g. The BET surface area is determined here via the carrier gas method ($He:N_2$=90:10) by the single-point method, as specified in DIN 66131 (1993). Before the measurement the sample is heated for 1 h at 140° C. in a dry nitrogen current.

The adsorbent composition preferably includes granules which have a mean particle size of 0.01 to 5 mm, particularly preferably 0.01 to 2 mm, and very particularly preferably 0.5 to 2 mm. Granules within the meaning of the invention means an asymmetric aggregate which does not have a harmonic geometric shape. An example of granules which meet these requirements is Bayoxide® E33.

The foam is preferably produced using a polyol mixture.

The foams preferably comprise a polyurethane foam, polyethylene foam, polystyrene foam or mixtures thereof.

If a polyurethane foam is used as foam, preferably use is made of a soft polyurethane foam, preferably a hydrophilic soft polyurethane foam.

The foam can, in addition, preferably be produced as composite flock foam or composite foam. Composite flock foams or composite foams within the meaning of the invention are foams which are pressed from foam wastes using a binder and the action of heat to form the composite blocks and are then cut into any desired shape. In the final processing of, for example, soft block polyurethane foam, or as reject parts in the production of soft moulded polyurethane foam, for example greater or lesser amounts of soft foam waste is produced. This may then be comminuted in what are termed flock mills. The flocks of differing size which are obtained after this working step are then sprayed with binder in a mixing drum, the mixture is then packed into a suitable mould, pressed to 50% to 10% of the packing height, reacted to completion and finally demoulded. The composite flock foam preferably has cavities which are if appropriate filled with adsorbent compositions.

Preferably, the foams are produced from a soft polyurethane foam which comprise an adsorbent composition of iron oxyhydroxide granules, the granules having a BET surface area of >100 $m^2$/g and a mean particle size of 0.01 to 2 mm. The content of adsorbent composition based on the total mass of foam is preferably 5 to 90% by weight, particularly preferably 5 to 45% by weight.

The invention also relates to a process for producing the inventive foams. This process is characterized in that the adsorbent composition is added to a liquid reaction mixture and this is foamed.

The liquid reaction mixture preferably comprises a polyol mixture, an isocyanate reaction component and if appropriate further additives and aids. The adsorbent composition is first premixed in the polyol components before it is foamed to form foam using an isocyanate reaction component and if appropriate further additives and aids. Further additives and aids which can be used, for example, are suitable propellants, silicone stabilizers and reaction catalysts.

The adsorbent composition is introduced, for example, into a standard polyol such as polyether alcohol containing oxyethylene and oxypropylene units having a mean molar mass of 2000-6000, preferably Arcol 1108, and foamed using an isocyanate reaction component, preferably toluylene diisocyanate (TDI) or diphenylmethane diisocyanate (MDI), with the conjoint use of suitable additives and aids. The content of the adsorbent composition is between 5 and 45% by weight, based on the total mass of foam. The foams thus prepared are then finally processed to make an exact fit and are used as products in a filter casing. The water, for cleaning, is pumped through the filter material.

The foams are preferably produced as composite flock foam in such a way that a foam is comminuted, adsorbent composition is added and, together with binder, in particular binder based on polyurethane reaction components, is pressed together again and reacted to completion. Preferably, a conventionally produced genuine, soft polyurethane foam preferably made hydrophilic is comminuted using flock mills (shredded), mixed with adsorbent composition and then, after addition of reactive polyurethane-based binder, cured in suitable moulds to form foam blocks of filter foam. "Genuine foam" is taken to mean a foam which is finished without adsorbent composition. The composite flock foam preferably has cavities which can be advantageous for filtering flowable media.

As foams to be comminuted, for example, use can also be made of suitable cutting residues which are inevitably produced in the final processing of soft block foam. Here, preference is to be given to the cutting residues of the inventive foams, with or without the adsorbent composition or soft foams made hydrophilic as foam flock material for the production. If appropriate, a higher proportion of adsorbent composition than would otherwise be possible using in situ foaming could be introduced into the foams.

The present invention also relates to the use of the inventive foams for removing pollutants and/or heavy metals such as phosphates, antimony compounds, beryllium compounds, selenium compounds, tellurium compounds, cyano compounds and arsenic compounds from flowable media such as gases and/or liquids such as water or waste water.

The foams can preferably be finally processed and used in filter casings in, for example, pumps in aquaria, garden ponds and/or other drinking water, service water or waste water purification plants.

EXAMPLES

Example 1

Description of the Production of Foam Which Comprises an Adsorbent Composition

Bayoxide® E33 having a granule size of 0.5-2 mm and a BET of 140 m²/g was premixed into a standard polyol mixture consisting of Arcol 1108® as polyether alcohol having oxyethylene and oxypropylene units of a mean molar mass of 2000-6000 and Desmophen® 41WB01 as a polyetherpolyol having a high ethylene oxide content and foamed using toluylene diisocyanate (Desmodur® T80) as isocyanate reaction component, with the conjoint use of further additives and aids such as silicone stabilizer OS20® as silicone stabilizer, tert-amine catalyst Desmorapid® DMEA and Dabco® 33LV and Desmorapid® SO as tin catalyst. The content of adsorbent composition is 27.8% by weight, based on the total mass of reaction mixture, or 29.5% by weight, based on the total mass of foam reacted to completion, taking into account the gas loss due to the carbon dioxide propellant formed. The finished hydrophilic foamed polyurethane blocks were finally processed to form shaped bodies so that these could be used in the filter housing.

Formula:

| | |
|---|---|
| Standard polyether polyol | 25 parts by weight |
| Ethylene oxide-containing polyetherpolyol | 75 parts by weight |
| Adsorbent composition | 60 parts by weight |
| Water (total) | 5.0 parts by weight |
| Silicone stabilizer | 1.5 parts by weight |
| Tert amine catalyst | 0.21 part by weight |
| Tin catalyst | 0.08 part by weight |
| Toluylene diisocyanate | 49.0 parts by weight |

In the examples hereinafter, the efficiency of the foams produced comprising an adsorbent composition and the advantages compared with granule powders are demonstrated with relation to the hydraulic properties (through-flow resistance) and contamination of the water by fine particles:

Example 2

A foam comprising an adsorbent composition produced according to Example 1 is used in a glass tube and flushed with 250 ml of mains water. For comparison, an equivalent amount of Bayoxide® E33 is packed into a glass tube, the filter base of which consists of a glass frit of size 1 (100-160 µm pore width) and is likewise flushed with 250 ml of mains water. The effluent filtrate is collected and the turbidity is measured as specified in DIN 38404 using the turbidity photometer LTP 5 from Lange; The mains water has a turbidity (TE-F) of 0.63. The water which has passed through Bayoxide® E33 has a turbidity of 7.30 and the water which has passed through the foam has a turbidity of 1.60.

In Table 1, as comparison, the turbidity of standardized $BaSO_4$ suspensions are also listed.

TABLE 1

Turbidity of aquarium water for different treatment

| Sample | Modification | TE-F | $BaSO_4$ $SO_4$ [mg/l] | Flow rate [l/h] |
|---|---|---|---|---|
| I | Foam with Bayoxide ® E33 | 1.60 | 0.8 | 45 |
| II | Bayoxide ® E33 | 7.30 | 3.0 | 45 |
| III | Mains water | 0.63 | 0.3 | — |

The results demonstrate that the foam offers considerable advantages with respect to the release of turbidity-causing material.

The efficacy of the foams comprising an adsorbent composition is verified by the following experimental arrangement:

Example 3

A phosphate solution comprising 2.90 mg/l is pumped through a foam comprising an adsorbent composition and for comparison through an equivalent amount of adsorbent composition. After 60 minutes; and after 12 hours, samples were taken and analysed for their phosphate content. The results are summarized in Table 2.

TABLE 2

Phosphate content of eluates (FeOOH amount corresponding to FeOOH content of the foam)

| Sample | Adsorber | Passage time [hours] | Phosphate content [mg/l PO$_4$] | Flow rate [l/h] |
|---|---|---|---|---|
| 1 | None | — | 2.90 | — |
| 2 | Bayoxide ® E33 | 1 | 1.05 | 45 |
| 3 | Bayoxide ® E33 | 12 | 0.50 | 45 |
| 4 | Foam comprising Bayoxide ® E33 | 1 | 2.30 | 45 |
| 5 | Foam comprising Bayoxide ® E33 | 12 | 0.38 | 45 |

The data verify that the efficacy of the adsorbent composition (Bayoxide® E33) is not impaired by the foaming.

In the following example, the hydraulic properties of an adsorbate powder bed are compared with those of the foam:

Example 4

TABLE 3

Dependence of flow on the amount of adsorbent composition packed

| Packed weight [g] | Packed volume [ml] | Packed height [mm] | Flow [l/h] |
|---|---|---|---|
| 1.00 | 2 | 2 | 45 |
| 2.00 | 4 | 4 | 14 |
| 5.00 | 10 | 10 | 5 |
| 10.00 | 20 | 20 | <2 |

Table 3 verifies that with increasing layer thickness of the adsorbent composition, the flow reduces greatly.

In contrast thereto, in the case of the foam comprising an adsorbent composition, the flow is virtually unchanged as a function of height, which is very advantageous for use in practice.

TABLE 4

Dependence of flow on the amount of foam packed

| Packed weight equivalent [g] | Packed height | Flow [l/h.] |
|---|---|---|
| 3.0 | 23.5 | 48 |
| 4.0 | 31.0 | 55 |
| 4.0 | 31.0 | 50 |
| 4.0 | 27.0 | 50 |
| 5.0 | 37.0 | 51 |
| 6.0 | 44.0 | 48 |

The reason for the efficacy of the absorber is still unclarified. It is suspected that by using granules, the surface area of the extremely finely divided adsorbate particles remains accessible to water, since the granule structure prevents sealing of the inner granule surface.

FIG. 1 shows the turbidity of aquarium water for different treatment. The y axis shows here the turbidity number TE-F. A here is mains water, B foam STD 755 and C Bayoxide® E33.

Figure 2:
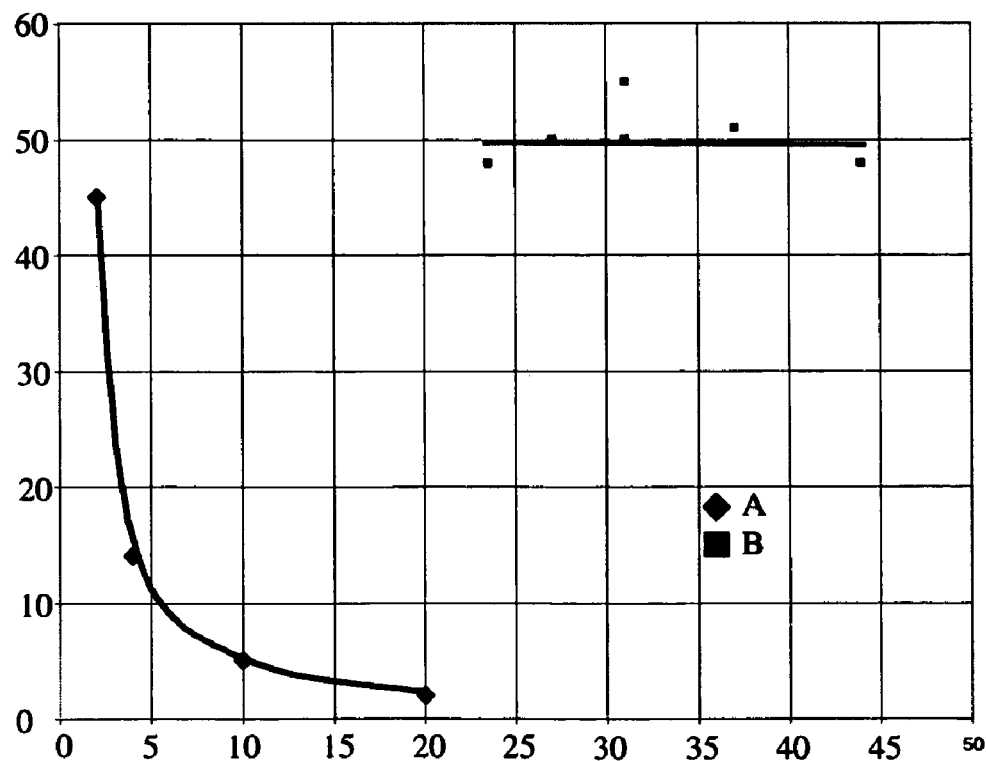
FIG. 2 is a graph illustrating flow for different packed heights including the present invention.

FIG. 2 shows the flow for different packed heights and summarizes Tables 3 and 4. The y axis here shows the flow in l/h, while the x axis represents the packed height in mm. A is Bayoxide® E33 and B a foam comprising Bayoxide® E33

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

The invention claimed is:

1. Foams comprising an iron oxyhydroxy granules as an adsorbent composition, whereby the foam is a composite foam of polyurethane foam, polyethylene, polystyrene foam, or mixtures thereof, which comprises cavities which are filled with the iron oxyhydroxy granules and the iron oxyhydroxy granules have a BET surface area of >100 m$^2$/g, a mean particle size of 0.5 to 2 mm and the content of adsorbent composition is 5 to 45% by weight, based on the total mass of foam.

2. A method of using a foam having an absorbent composition that was added to a liquid reaction mixture prior to forming the foam comprising:
   providing the foam;
   providing a flowable media to the foam;
   removing pollutants and/or heavy metals from the flowable media.

3. The method of claim 2, wherein the pollutants and/or heavy metals are selected from the group consisting of phosphates, antimony compounds, beryllium compounds, selenium compounds, tellurium compounds, cyano compounds, arsenic compounds and combinations thereof.

4. The method of claim 2 wherein the flowable media is water or wastewater.

5. The method of claim 2, wherein the flowable media is selected form gases, liquids or combinations thereof.

6. The method of claim 2, wherein the foam is used in a filter casing of a pump, and wherein the casing is used for filtering water in things selected from aquaria, garden ponds, waste water purification plants and combinations thereof.

7. The method of claim 2, wherein the absorbent compound oomprises iron oxyhydroxy granules having a BET surface area of >100 m$^2$/g and a mean particle size of 0.5 to 2 mm.

8. The method of claim 2, wherein the content of adsorbent composition is 5 to 45% by weight, based on the total mass of foam.

* * * * *